United States Patent [19]

Urry

[11] Patent Number: 5,674,639
[45] Date of Patent: Oct. 7, 1997

[54] SEPARATOR FOR ALKALINE ELECTROCHEMICAL CELLS

[75] Inventor: Lewis Frederick Urry, Elyria, Ohio

[73] Assignee: Eveready Battery Company, St. Louis, Mo.

[21] Appl. No.: 477,016

[22] Filed: Jun. 7, 1995

[51] Int. Cl.$^6$ .............................. H01M 2/16; H01M 2/18; H01M 2/02; H01M 6/00

[52] U.S. Cl. .................... 429/122; 429/133; 429/134; 429/140; 429/164; 429/165; 429/166; 429/171; 429/174; 429/185; 429/249; 429/251; 29/623.1; 29/623.2

[58] Field of Search ............................ 429/122, 133, 429/140, 134, 164, 165, 166, 185, 171, 174, 251, 249; 29/623.1, 623.2

[56] References Cited

U.S. PATENT DOCUMENTS

| | | | |
|---|---|---|---|
| 3,748,181 | 7/1973 | Alberto | 429/133 |
| 5,154,731 | 10/1992 | Winger | 29/623.2 |
| 5,283,139 | 2/1994 | Newman et al. | 429/224 |

FOREIGN PATENT DOCUMENTS

| | | |
|---|---|---|
| 750498 | 1/1967 | Canada. |
| 48-27092 | 8/1973 | Japan. |
| 55-30159 | 3/1980 | Japan. |

*Primary Examiner*—Kathryn L. Gorgos
*Assistant Examiner*—Edna Wong
*Attorney, Agent, or Firm*—Allan Fraser; Vivien Y. Tsang

[57] ABSTRACT

An electrochemical cell includes a first active electrode material having a tubular shape closed at one end and open at the other, a second active electrode material disposed within the cavity of the tubular shaped first active electrode material, a scrolled separator disposed between the sidewalls of the cavity and the second active electrode material, and an insulator disc disposed between the closed end of the cavity and the second active electrode material. The scrolled separator and insulator disc cooperate to provide a liner which provides a continuous electrical and physical barrier between the cavity walls and the second active electrode material disposed within the cavity. The cell utilizes a simple design which minimizes space occupied by the separator and insulator disc, while maximizing the available area for ion mass transfer between the electrodes, whereby greater cell efficiency and improved performance characteristics are achieved.

27 Claims, 1 Drawing Sheet

SEPARATOR FOR ALKALINE ELECTROCHEMICAL CELLS

BACKGROUND

The invention relates to an electrochemical cell, especially alkaline cells which employ a tubular separator which electronically isolates a first active electrode material from a second active electrode material while allowing ions to pass therethrough. More particularly, the invention relates to electrochemical cells having a first active electrode material which is separated from a second active electrode material by a tubular separator which is open at each end and a disc-shaped separator which closes one end of the separator tube to provide a continuous electrical insulating barrier between the two electrode materials while allowing ions to flow therebetween. This invention also relates to a method of preparing such electrochemical cells.

Alkaline cells are typically comprised of a first active electrode material, such as a solid cathode comprised of an oxide depolarizer such as manganese dioxide, and a second active electrode material, such as an anode gel composed of a consumable anodic material such as zinc admixed with a gelling agent and an alkaline electrolyte. The first active electrode material is generally formed into a tubular structure having a central cylindrical cavity which is closed at one end and open at the other. The second active electrode material occupies generally most of the space within the cavity of the first active electrode material. An absorbent, ion permeable separator material lines the cavity to prevent contact between the two electrode materials. The lining or separator is generally a paper-like material which is sufficiently non-porous to prevent particles of the two electrode materials from passing through, yet absorbent and permeable enough to allow ions in an electrolyte to pass from one electrode material (such as an anode gel) to the other electrode material (such as a cathode mix containing an oxide depolarizer). The separator must also be an electrical insulator to prevent electrons from passing directly from one electrode material to the other. In addition to the foregoing requirements, it is generally desirable to minimize the amount of volume which the separator and other inactive materials occupy, so that the maximum amount of space is occupied by the active electrode materials. It is also desirable to minimize ion transport resistances by maximizing the area available for ion transfer from one electrode to the other through the separator, and by minimizing the thickness of the separator while still electrically and physically isolating the two electrodes. The foregoing objectives must generally be achieved while maintaining a simple design which is easy and relatively inexpensive to mass produce, with little variability in performance and reliability among individually produced cells.

In order to meet all of the desired objectives alkaline cells are typically provided with separators formed of multiple strips of overlapping paper-like material which are folded to form a basket-like separator which completely lines the cavity of a first electrode material. There are several problems and disadvantages associated with this type of design. The basket-like separators are generally formed by using a rod to drive the center region of the separator strips into the closed end of the cavity in the first electrode material. This can occasionally cause pieces of the first electrode material to be driven into and partially through the separator, resulting in a useless, short-circuited cell. Additionally, such basket type separators have two overlaps per basket which reduces the amount of space available for active electrode materials in a given size cell. Another problem with most basket-type separators is that they generally have undesirable folds or "ears" at the closed end of the cavity in the first electrode material. These undesirable folds, in addition to occupying space which could be used to add more electrode material to the cell, can allow electrode material, such as zinc particles in an anode gel, to migrate to the other electrode material, by working its way between the strips, eventually causing an electrical short within the cell. The undesirable fold or ears of basket-type separators can also protrude into the cavity and prevent electrode material, such as an anode gel, from falling into the cavity of the first electrode material, thereby causing the electrode material being deposited within the cavity to project above the top of the cavity and causing the electrode materials to come into direct contact with each other. U.S. Pat. No. 5,154,731 assigned to Eveready Battery company, provides a separator arrangement comprising two substantially completely overlapping separator strips having notches in the center region thereof to eliminate problems associated with the "ears" of conventional basket-type separators. However, it would still be desirable to reduce the amount of overlap of the separator material to provide more space for active electrode material in a given size cell.

Other alkaline cell designs have an impermeable end plug, such as wax or plastic, to isolate the first electrode material from the second electrode material at the closed end of the cavity in the first electrode material. Such designs have generally employed a scrolled separator having multiple wraps or plys. These designs eliminate some of the problems associated with the ears of conventional basket-type separators, but still occupy a significant amount of space which could otherwise be used to add more active electrolyte material to a given size cell. Additionally, the impermeable end plug reduces the area available for mass transfer of ions and thus reduces discharge rate capacity and cell efficiency.

Another disadvantage with many alkaline type cells is that when the cell is subjected to a heavy discharge rate, the separator and the anode material immediately adjacent to the separator will dry out due to high rates of water consumption at the cathode, which can result in poor cell performance on account of low ion transport rates. Accordingly, it would also be desirable to provide a cell design which is better capable of keeping the separator wet.

SUMMARY

The invention provides a simple electrochemical cell design utilizing a two piece separator system comprising a scrolled, cylindrical separator which is open at both ends, and an insulating disc which closes off one end of the cylindrical separator to provide a continuous barrier which electrically and physically isolates a first electrode material from a second electrode material disposed in a central cavity of the first electrode material. The cells of the invention are easy and relatively inexpensive to make and mass produce with little performance variability amongst different cells which are mass produced. The cell provides low ion transport resistances by minimizing the ion flow path between electrodes and maximizing the area for ion mass transfer between an electrode material disposed in a cylindrical cavity of another electrode material and that other electrode material, resulting in improved cell efficiency and higher discharge rate capacity. The cell also utilizes a separator system which occupies less volume than conventional separators, thereby allowing more space to be dedicated to active electrode material, whereby higher energy capacity can be achieved for a given size cell.

In accordance with one aspect of the invention an electrochemical cell includes first and second active electrode materials, with the second active electrode material being disposed within a central cavity of the first active electrode material. An electrolyte absorbent, ion permeable, scrolled separator is disposed between the inner side walls of the cavity and the second active electrode material, and an electrolyte absorbent, ion permeable insulator disc is disposed within the first active electrode, between the closed end thereof and the second active electrode. The scrolled separator and insulator disc cooperate to provide a continuous barrier which electrically and physically isolates the electrode materials from each other while allowing ions to flow therebetween.

In accordance with a preferred mode of practicing the invention, the separator is comprised of a single sheet of an absorbent, ion permeable separator material which is coiled so that opposing side edges thereof are brought together and overlap. The amount of overlap is preferably kept to a minimum to reduce the volume occupied by the separator and to minimize the ion transport path between electrode materials. Desirably, the overlap is about 3 millimeters or less.

The separator material is preferably about 2 to about 10 mils thick, and the insulator disc is preferably about 10 to about 100 mils thick, with the diameter of the disc desirably being slightly greater than the diameter of the cavity in the first active electrode material less twice the thickness of the separator material, so that the separator and disc are retained within the cavity by an interference type fit. The insulator disc is preferably thicker than the separator wall to help hold the separator in place and keep the separator moist during heavy discharge of the cell.

In accordance with a further aspect of the invention, there is provided an electrochemical cell having a cylindrical casing with a positive terminal electrically connected thereto, a solid cathode having a central cavity and which is disposed in the casing, an anode gel disposed within the cavity of the cathode, and an ion permeable, scrolled separator disposed between the inner side walls of the central cavity and the anode gel. Also disposed within the cavity of the cathode is an ion permeable, insulator disc. The insulator disc is positioned at the closed end or bottom of the cavity in the cathode between the cathode and the anode gel. The separator and disc cooperate to provide a continuous barrier between the electrodes while permitting ion transfer from one electrode to the other. The cell also includes a negative terminal and a collector rod which provides an electrical connection between the anode gel and the negative terminal.

A method for preparing an electrochemical cell is also provided. The method includes disposing a cathode mix into a cylindrical casing, forming a central cavity in the cathode mix, inserting a scrolled separator and an insulator disc into the catty to substantially completely line the cavity, and filling the lined cavity with an anode gel. The method also includes closing the open end of the casing with a seal assembly and providing a negative terminal and an electrical connection between the anode gel and the negative terminal.

The invention provides a method of making cells which are simpler and easier to reliably mass produce with consistent high performance characteristics. The cells of the invention utilize less volume for the separator than do conventional alkaline cells, and provide lower ion transfer resistance, which result in greater energy capacity, higher discharge rate capacity and better cell efficiency.

DESCRIPTION OF THE PREFERRED EMBODIMENT

Figure 1:
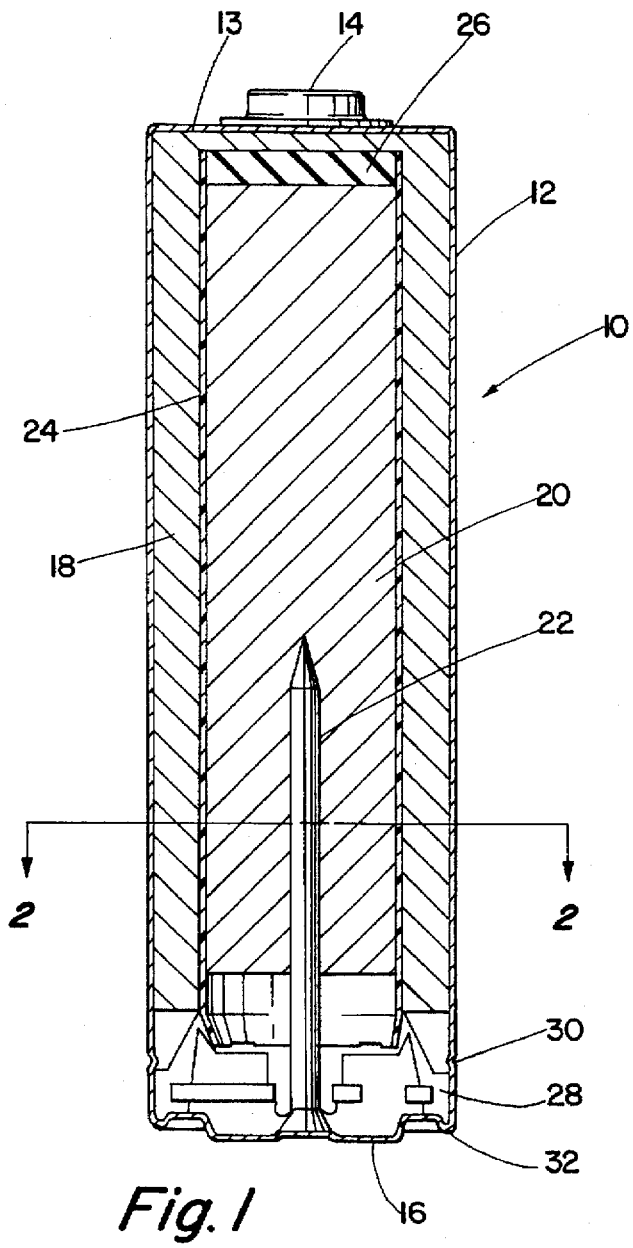
FIG. 1 is an elevational view in cross-section.

With reference to the drawings, especially FIG. 1, there is shown an electrochemical cell 10 having a cylindrical electrically conductive casing 12 having an end wall 13, a positive terminal 14 which is electrically connected to the casing wall 13, a negative terminal 16, a solid cathode 18 having a closed end tubular structure, an anode gel 20 disposed within the central cavity of the closed end tubular cathode, and a collector rod 22 partially protruding into the anode gel and in electrical contact with the negative terminal. Disposed between the solid cathode 18 and the anode gel 20 is a separator 24 which is comprised of a paper-like material which is wound or coiled to form a cylindrical, tubular or scrolled structure which is open at both ends. The separator 24 electrically isolates the anode 20 from the cathode 18 while simultaneously allowing ions to flow between the electrodes. An insulator disc 26, which can also be comprised of a paper-like material, is positioned between the closed end of the central cavity of the cathode 18, and the anode gel 20 which is disposed therein. The insulator disc 26 cooperates with the separator 24 to provide a continuous electrical insulating barrier between the inner surfaces of the central cavity in the closed end of tubular cathode 18, and the anode gel 20, while allowing ions to flow between the electrodes through both the separator and the insulator disc. The term "electrical insulating barrier" as used herein to describe the separator and insulator disc means that the separator and insulator disc are substantially incapable of conducting electrons. The term "ion permeable" as used herein to describe the separator and insulator disc means that the separator and insulator disc will allow ions to pass through when moist with an electrolyte. The outer side walls of the tubular cathode 18 are in substantially continuous electrical contact with the inner side walls of the conductive casing 12. The cell 10 also includes an insulating seal member 28 which acts in combination with negative terminal 16 to form a sealed closure at the negative end of the cell while electrically isolating the casing from the negative terminal.

The casing 12, terminals 14, 16, electrodes 18, 20, collector rod 22 and insulating seal member 28 can be of generally any suitable type, such as any of various designs which are well known in the art pertaining to the preparation of electrochemical cells. The casing 12 and terminals, for example, can be made of any of various highly electrically conductive materials that are not attacked by the cathode materials such as steel or nickel. A preferred material for the casing and terminals is nickel plated steel. The cathode can be comprised predominantly of an oxide depolarizer such as powdered manganese dioxide, generally mixed with particles of a conductive material such as carbon black, graphite, acetylene black, etc., and a binder such as polytetrafluoroethylene. The anode gel can be composed of a consumable anodic material such as a powdered zinc admixed with a gelling agent such as polyacrylic acid or carboxymethyl cellulose and a suitable alkaline electrolyte such as an aqueous potassium or sodium hydroxide solution. The collector rod 22, which has a generally spike or nail shape, provides an electrically conductive connection between the anode gel 20 and the negative terminal 16. The collector rod 22 can be comprised of generally any electrically conductive material which is suitably resistant to chemical attach by the anode gel, especially attack by the alkaline electrolyte thereof. A preferred collector for use with the invention is indium plated brass.

The separator 24 is composed of any of various paper-like sheets or mats of woven or nonwoven, synthetic or natural, electrically insulating fibrous materials including cellulosic fibers, various thermoplastic fibers and combinations thereof. Preferred separator materials include paper of cellulose fibers laminated to a mat of vinyl fibers, kraft paper, alpha cellulose paper, methyl cellulose film, polyvinyl alcohol, copolymers of vinyl acetate and vinyl chloride, rayon, nylon, and mixtures thereof. The separator material should be electrically insulating and flee of holes which would allow the consumable anodic material to pass therethrough and cause short circuiting of the cell. The separation material should also be sufficiently absorbent and permeable to allow the ions in the electrolyte to pass therethrough. A preferred separator, available from Berec Co., is comprised of cellophane laminated to paper.

Figure 2:
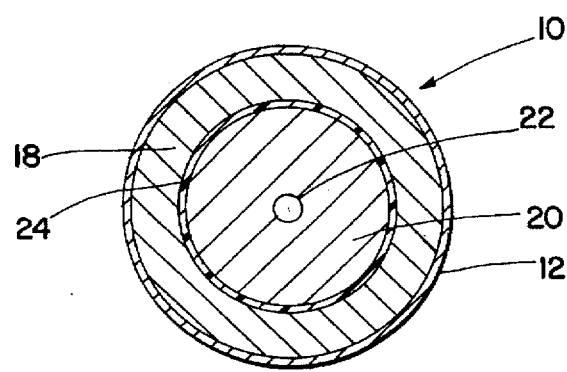
FIG. 2 is a cross-sectional view along lines II—II of FIG. 1.

The separator 24 is most preferably prepared by winding or coiling a generally rectangular sheet of separator material to form an open ended cylindrical tube which is inserted into a central cavity in the cathode 18. The separator material is preferably relatively thin such as from about 2 to about 10 mils, and more desirably from about 3 to about 5 mils. Desirably, the separator is generally comprised of a single layer of relatively thin separator material having a minimum amount of overlap (as shown in FIG. 2) at the opposing edges thereof, which are brought together to form the open ended cylindrical tube. More specifically, the amount of overlap at the opposing edges of the sheet of separator material which is used to form the open ended cylindrical tube separator 24 is generally the minimum amount needed to assure that there is no gap between the edges which would cause short circuiting of the cell rendering it useless. For high speed, mass production processes, it is typically desirable to cut the separator sheets so that when they are coiled into a scrolled (open-ended cylinder shape) separator, with the opposing edges which are brought together having an overlap of from about 1 millimeter or less, up to about 2 or 3 millimeters or less. By minimizing the thickness of the separator 24 and the amount of overlap, ion transfer resistance is lowered whereby improved discharge rate capacity can be achieved, and the amount of anodic material which can be incorporated within a given size cell is increased whereby higher energy storage capacity can also be achieved.

The insulator disc 26 is comprised of an electrically insulating material which is sufficiently absorbent and permeable to allow the ions in the electrolyte to pass through, but sufficiently nonporous to prevent the consumable anodic material to pass therethrough and cause short circuiting of the cell. The insulator disc 26 can be comprised of material which is identical to those materials which are suitable for use in preparing the separator 24. Specifically, various paper-like sheet materials comprised of woven or nonwoven, synthetic or natural fibers, and combinations and laminated composites thereof can be used. Additionally, the insulator disc 26 can be prepared from various open cell plastic foams having sponge-like properties, i.e., absorbency. For example, foamed polyurethanes, foamed polyethylene, and formed polypropylene can be used. The insulator disc 26, which is preferably prepared by cutting or punching a circular portion from a sheet of paper-like or sponge-like material having the desired absorbency, permeability and nonporous properties, is preferably thicker than the separator 24, so that the insulator disc 26 can be used to hold edges of the separator 24 firmly against the cathode material at the closed end of the tubular cathode 18. A suitable minimum thickness, which will allow the insulator disc 26 to hold the separator in place is about 10 mils. The insulator disc 26 occupies space which could otherwise be used to incorporate more anodic material into the cell to increase the energy storage capacity of a given size cell. Additionally, the thickness of the insulation disc 26 will affect the efficiency of the cell, with thicker insulation discs lowering the discharge rate capacity of the cells decreasing the anode to cathode surface area. Accordingly, the thickness of the insulator disc 26 is preferably kept below about 100 mils so as to minimize adverse effects on cell efficiency, discharge capacity and discharge rate.

The insulator disc is preferably thicker than the separator so that it will help hold the separator in place. Additionally, the relatively thick insulator disc acts as an electrolyte reservoir which keeps the separator moist even when the cell is subjected to a heavy discharge rate. That is to say, with the present invention, water is drawn up through the separator from the relatively thick, absorbent insulator disc by capillary or wick action to keep the interface between the anode and cathode wet even when the cell is subjected to a heavy discharge rate. The combination of a scrolled separator and a relatively thick, absorbent insulator disc, which acts as an electrolyte reservoir, is particularly beneficial for alkaline cells having a relatively high height to diameter ratio, such as AAA and AAAA type alkaline cells.

The electrochemical cells of the invention can be prepared by disposing a cathode mix into the open end (bottom of cell casing shown in FIG. 1) of a suitable cell casing 12, and pressing the cathode mix such as by impact extrusion or by inserting a conventional molding rod into the cathode mix to form a central cavity in the cathode mix and shape it into a tubular cathode 18 having an open end and a closed end. A similar shaped cathode can be formed by molding rings separately and forcing them into casing 12. The scrolled separator 24 is then inserted into the central cavity such that the outer surface of the scrolled separator contacts the internal side walls of the central cavity in the cathode 18. One end of the separator 24 is located at the closed end of the tubular cathode 18, and the other end preferably extends outwardly slightly beyond the open end of the cathode 18. The insulator disc 26 is then inserted into the central cavity of the cathode and abuts the interior surface of the closed end of the cathode cavity. The diameter of the insulator disc 26 is preferably sized so that an interference fit is achieved between the inner surface of the scrolled separator 24 and the insulator disc when the separator is firmly pressed against the internal side walls of the central cavity in the cathode 18. That is, the diameter of the insulator disc 26 is preferably slightly greater than the diameter of the central cavity in cathode 18 less twice the thickness of the separator wall, and preferably less than the diameter of the central cavity, so that the separator 24 is compressed between the cathode 18 and the insulator disc 26 at the end of the separator located adjacent the closed end of the cathode cavity, whereby the separator is retained by the insulator disc 26, and so that the separator and the insulator disc cooperate to provide a continuous liner which isolates the cathode 18 from anode gel subsequently disposed within the lined central cavity of the cathode. After the anode gel 20 is dispersed into the lined central cavity of the cathode, a seal assembly, including an insulating seal 28, negative terminal 16, and collector rod 22 which projects into the anode gel 20 and is in electrical contact with negative terminal 16, is secured to close the open end of the casing. The insulating seal 28 is preferably a plastic disc-shaped member that fits tightly within the open end of the casing 12 and is seated slightly inward of the outer edge of the open end of the casing so that the outer edges of the casing can be crimped inwardly over the seal 28. The casing 12 may also be redrawn inwardly to form a circumferential groove 30, which together with the crimped edge 32 tightly retains the seal 28 to form a closure at the open end of the casing.

The embodiments of the invention in which an exclusive property or privilege is claimed are defined as follows:

1. An electrochemical cell, comprising:
   a first active electrode material having a central cavity including inner side walls and a closed end opposite an opening to said central cavity;
   a second active electrode material disposed within said central cavity;
   an electrolyte which is contained within at least one of the electrode materials;
   an electrolyte absorbent, scrolled cylindrical separator which is open at both ends and is disposed between said inner side walls of said central cavity of said first active electrode material and said second active electrode material; and
   an electrolyte absorbent insulator disc disposed within said central cavity of said first active electrode, between said closed end thereof and said second active electrode material;
   said scrolled separator and said insulator disc cooperating to provide a continuous electrical insulating barrier between said first active electrode material and said second active electrode material, said barrier allowing ions to flow therethrough from one of said active electrode materials to the other.

2. The electrochemical cell of claim 1, wherein said separator is comprised of an absorbent, ion permeable, woven or nonwoven mat of a synthetic or natural, electrically insulating fibrous material.

3. The electrochemical cell of claim 1, wherein said separator is comprised of cellulose fibers.

4. The electrochemical cell of claim 1, wherein said separator is comprised of a mat of cellulose fibers laminated to a mat of vinyl fibers, kraft paper, alpha cellulose paper, methyl cellulose film, polyvinyl alcohol, copolymers of vinyl acetate and vinyl chloride, rayon, nylon, or mixtures thereof.

5. The electrochemical cell of claim 1, wherein said separator is comprised of a sheet of absorbent, ion permeable material formed from electrically insulating fibers, and wherein said sheet is coiled to form an open ended cylindrical tube.

6. The electrochemical cell of claim 5, wherein said sheet is from about 2 to about 10 mils thick.

7. The electrochemical cell of claim 6, wherein said separator is comprised of a single layer of said sheet which is coiled with opposing edges thereof overlapping by about 3 millimeters or less.

8. The electrochemical cell of claim 5, wherein said insulator disc is comprised of an absorbent, ion permeable, electrically insulating material.

9. The electrochemical cell of claim 8, wherein said material used to form said insulator disc is comprised of synthetic or natural fibers, or a foamed plastic.

10. The electrochemical cell of claim 8, wherein said insulator disc is about 10 to about 100 mils thick.

11. The electrochemical cell of claim 10, wherein said insulator disc has a diameter greater than the diameter of said central cavity of said first active electrode material less twice the thickness of said separator, whereby edges at the end of said separator adjacent said closed end of said central cavity of said first active electrode material are compressed between said inner side walls of said central cavity of said first active electrode material and said insulator disc.

12. An electrochemical cell, comprising:
   a cylindrical casing having interior walls;
   a positive terminal electrically connected to said casing;
   a solid cathode having a tubular structure with a closed end and an open end, said tubular cathode having exterior side walls in contact with said interior walls of said cylindrical casing;
   an anode gel containing an electrolyte, said anode gel disposed within a central cavity of said tubular cathode;
   an electrolyte absorbent, scrolled separator disposed between inner side walls of said central cavity of said tubular cathode and said anode gel;
   an electrolyte absorbent, insulator disc disposed within said central cavity of said solid cathode, between said closed end thereof and said anode gel;
   a collector rod projecting into said anode gel; and
   a negative terminal electrically connected to said collector rod and electrically insulated from said casing;
   said scrolled separator and said insulator disc cooperating to provide a continuous electrical insulting barrier between said solid cathode and said anode gel, said barrier allowing ions to flow therebetween.

13. The electrochemical cell of claim 12, wherein said separator and said insulator disc are each comprised of an absorbent, ion permeable, electrically insulating material.

14. The electrochemical cell of claim 13, wherein said separator is comprised of a sheet of absorbent, ion permeable material formed from electrically insulating fibers, and wherein said sheet is coiled to form an open ended cylindrical tube.

15. The electrochemical cell of claim 14, wherein said sheet is from about 2 to about 10 mils thick.

16. The electrochemical cell of claim 15, wherein said separator is comprised of a single layer of said sheet which is coiled with opposing edges thereof overlapping by about 3 millimeters or less.

17. The electrochemical cell of claim 16, wherein said material used to form said insulator disc is comprised of synthetic or natural fibers, or a foamed plastic.

18. The electrochemical cell of claim 17, wherein said insulator disc is about 10 to about 100 mils thick.

19. The electrochemical cell of claim 18, wherein said insulator disc has a diameter greater than the diameter of said central cavity of said cathode less twice the thickness of said separator, whereby edges at the end of said separator adjacent said closed end of said central cavity of said cathode are compressed between said inner side walls of said central cavity of said cathode and said insulator disc.

20. A method of preparing an electrochemical cell, comprising:
   disposing a cathode mix into an open end of a cylindrical casing having a positive terminal in electrical contact therewith;
   forming a central cavity with a closed end in said cathode mix;
   inserting into said central cavity a scrolled separator comprised of a sheet of absorbent, ion permeable material which is coiled to form an open ended cylindrical tube, outer surfaces of which contact inner side walls of said central cavity of said cathode mix;

positioning an insulator disc comprised of an absorbent, ion permeable material within said central cavity such that said insulator disc abuts an interior surface of the closed end of said central cavity and inner surfaces of said separator to form a continuous liner in said central cavity;

dispensing an anode gel into the lined central cavity of said cathode mix;

closing the open end of said casing with a seal assembly; and providing a negative terminal and an electrical connection between said anode gel and said negative terminal;

said scrolled separator and said insulating disc cooperating to provide a continuous electrical insulating barrier between said cathode mix and said anode gel, said barrier allowing ions to flow therethrough from said anode gel to said cathode mix.

21. The method of claim 20, wherein said separator and said insulator disc are each comprised of an absorbent, ion permeable, electrically insulating material.

22. The method of claim 21, wherein said separator is comprised of a sheet of absorbent, ion permeable material formed from electrically insulating fibers, and wherein said sheet is coiled to form an open ended cylindrical tube.

23. The method of claim 22, wherein said sheet is from about 2 to about 10 mils thick.

24. The method of claim 23, wherein said separator is comprised of a single layer of said sheet which is coiled with opposing edges thereof overlapping by about 3 millimeters or less.

25. The method of claim 24, wherein said material used to form said insulator disc is comprised of synthetic or natural fibers, or a foamed plastic.

26. The method of claim 25, wherein said insulator disc is about 10 to about 100 mils thick.

27. The method of claim 26, wherein said insulator disc has a diameter greater than the diameter of said central cavity of said cathode less twice the thickness of said separator, whereby edges at the end of said separator adjacent said closed end of said central cavity of said cathode are compressed between said inner side walls of said central cavity of said cathode and said insulator disc.

* * * * *